United States Patent
Khieowan et al.

(10) Patent No.: US 9,937,825 B2
(45) Date of Patent: *Apr. 10, 2018

(54) ADJUSTABLE SEAT

(71) Applicant: Feelfree US LLC, Swannanoa, NC (US)

(72) Inventors: Sakun Khieowan, Bangkok (TH); Peter James Murphy, Bangkok (TH)

(73) Assignee: FEELFREE US LLC, Swannanoa, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/676,495

(22) Filed: Aug. 14, 2017

(65) Prior Publication Data

US 2017/0361738 A1 Dec. 21, 2017

Related U.S. Application Data

(63) Continuation of application No. 14/792,975, filed on Jul. 7, 2015, now Pat. No. 9,764,664.

(60) Provisional application No. 62/021,261, filed on Jul. 7, 2014.

(51) Int. Cl.
| | |
|---|---|
| *B63B 29/04* | (2006.01) |
| *B60N 2/30* | (2006.01) |
| *B63B 35/71* | (2006.01) |
| *B60N 2/16* | (2006.01) |

(52) U.S. Cl.
CPC ........... *B60N 2/3097* (2013.01); *B60N 2/162* (2013.01); *B60N 2/167* (2013.01); *B63B 35/71* (2013.01); *B63B 2035/715* (2013.01)

(58) Field of Classification Search
CPC ........................................................ B63B 29/04
USPC ................................................. 114/347, 363
See application file for complete search history.

(56) References Cited

U.S. PATENT DOCUMENTS

| | | | | |
|---|---|---|---|---|
| 2,521,265 | A | * | 9/1950 | Starr ..................... A47D 1/103 248/421 |
| 2,824,600 | A | * | 2/1958 | Baumgardner .......... A47C 4/26 297/34 |
| 3,709,554 | A | * | 1/1973 | Feher ................... A47C 1/0265 297/26 |
| 4,666,119 | A | * | 5/1987 | Dose ....................... B63B 29/04 248/166 |
| 4,730,571 | A | * | 3/1988 | Hedlund ................. B63B 1/121 114/61.24 |
| 4,768,454 | A | * | 9/1988 | Selken ..................... B63B 7/02 114/344 |

(Continued)

*Primary Examiner* — Lars A Olson
*Assistant Examiner* — Jovon Hayes
(74) *Attorney, Agent, or Firm* — The Webb Law Firm (57) ABSTRACT

An adjustable seat has a seat base having a front end and a rear end, a front leg assembly having a top end engaged with the rear end of the seat base and a bottom end opposite the top end for engaging a supporting surface, and a back leg assembly having a top end engaged with the front end of the seat base and a bottom end opposite the top end for engaging the supporting surface. The back leg assembly is pivotally connected to the front leg assembly between the top end and the bottom end of the front leg assembly and the back leg assembly. The adjustable seat has an adjustment assembly for selectively locking the front leg assembly relative to the back leg assembly at one of a plurality of lockable positions between a first position and a second position.

20 Claims, 10 Drawing Sheets

(56) References Cited

U.S. PATENT DOCUMENTS

| | | | | |
|---|---|---|---|---|
| 4,843,999 | A * | 7/1989 | Kobus | B63B 29/04 |
| | | | | 114/347 |
| 5,513,900 | A * | 5/1996 | Iglesias | A47C 7/002 |
| | | | | 248/501 |
| 5,622,403 | A * | 4/1997 | Gonda | B63B 7/06 |
| | | | | 114/363 |
| 5,651,706 | A * | 7/1997 | Kasper | B63B 7/082 |
| | | | | 114/354 |
| 5,779,314 | A * | 7/1998 | Grace | A47C 1/146 |
| | | | | 297/25 |
| 5,964,178 | A * | 10/1999 | Gonda | B63B 7/06 |
| | | | | 114/347 |
| 6,095,599 | A * | 8/2000 | Lambert | A47C 13/00 |
| | | | | 224/155 |
| 6,736,084 | B2 * | 5/2004 | McDonough | B63B 29/04 |
| | | | | 114/347 |
| 6,926,355 | B2 * | 8/2005 | Le Gette | A45F 4/02 |
| | | | | 297/129 |
| 8,979,185 | B1 * | 3/2015 | Redel | A47C 4/24 |
| | | | | 297/19 |
| 2004/0251726 | A1 * | 12/2004 | Alexander, Jr. | A47C 3/36 |
| | | | | 297/344.18 |
| 2009/0038526 | A1 * | 2/2009 | Walton | B63B 29/04 |
| | | | | 114/347 |
| 2013/0239873 | A1 * | 9/2013 | Dow | B63B 29/04 |
| | | | | 114/363 |
| 2016/0001853 | A1 * | 1/2016 | Khieowan | B60N 2/167 |
| | | | | 114/363 |

* cited by examiner

ADJUSTABLE SEAT

CROSS-REFERENCE TO RELATED APPLICATIONS

The present application is a continuation of U.S. application Ser. No. 14/792,975, filed Jul. 7, 2015, which claims priority to U.S. Provisional Application No. 62/021,261, filed on Jul. 7, 2014, the disclosures of which are incorporated herein by reference in their entirety.

BACKGROUND OF THE DISCLOSURE

Field of the Disclosure

The present disclosure relates generally to an adjustable seat, and more specifically to an adjustable seat that may be raised and lowered to multiple heights using a ratcheting-type mechanism on the seat legs and an adjustable seat that can be disengaged from a locked position and lowered using a release handle. The adjustable seat may be used in small watercraft.

Description of Related Art

Adjustable seats are desirable for many applications. One such application is for use with small watercraft, such as kayaks and canoes. Users of kayaks and canoes generally prefer to utilize a seat that is low (close to the water) when they are paddling. The low position of the seat lowers the center of gravity of the watercraft, thereby increasing its stability. However, an elevated seat position may be preferred when the watercraft is stationary for activities such as fishing. The elevated position provides a comfortable seating position for casting and sighting. Conventional seat adjustment mechanisms in kayaks and canoes are often difficult to adjust. This is frequently due to designs where the seat adjustment mechanisms are integrated into the shell or body of the watercraft. These prior art mechanisms require the user to adjust the seat height by removing an attachment point of the seat to the watercraft and re-attaching the seat to another point or position on the watercraft. Such adjustment can often be performed only while the user is out of the watercraft. It would be desirable to develop new adjustable seats that allow for height adjustment while allowing the user to remain seated within the watercraft.

SUMMARY OF THE DISCLOSURE

In view of the foregoing, a need exists for a stand-alone adjustable seat that is not integral or otherwise necessarily connected to the body of the small watercraft, such as a kayak or canoe. For example, the adjustable seat can be sold separately from any specific watercraft, and can be used with watercraft from various manufacturers. The adjustable seat can be used with any watercraft having a beam that is wide enough to accommodate the dimensions of the seat. The adjustable seat is not dependent upon the body of the watercraft to be either raised or lowered. Other than the points of contact where the seat is placed on the beam of the watercraft, no other point of contact between the seat and the watercraft is needed for the height of the seat to be adjusted.

A feature of the adjustable seat is its ability to raise and lower the relative height of the seat without repositioning its points of contact with the watercraft. In an embodiment, the relative height of the seat is set based upon the scissor action of the seat legs. The legs of the seat open and close in a scissor-like fashion and are held in place at varying heights by an adjustment assembly that releasably locks the position of the legs relative to one another.

In some aspects of the present disclosure, an adjustable seat may include a seat base having a front end and a rear end, a front leg assembly having a top end engaged with the rear end of the seat base and a bottom end opposite the top end for engaging a supporting surface, and a back leg assembly having a top end engaged with the front end of the seat base and a bottom end opposite the top end for engaging the supporting surface. The back leg assembly may be pivotally connected to the front leg assembly between the top end and the bottom end of the front leg assembly and the back leg assembly. The seat may have an adjustment assembly for selectively locking the front leg assembly relative to the back leg assembly at one of a plurality of lockable positions between a first position and a second position. The seat base may be elevated higher relative to the supporting surface in the second position than in the first position.

In some aspects of the present disclosure, at least one of the bottom end of the front leg assembly and the bottom end of the back leg assembly may be fixed to the supporting surface. At least one of the bottom end of the front leg assembly and the bottom end of the back leg assembly may slidably engage the supporting surface. At least one of the top end of the front leg assembly and the front end of the bottom end of the back leg assembly may be fixed to the seat base. At least one of the top end of the front leg assembly and the front end of the bottom end of the back leg assembly may slidably engage the seat base. The top end of the back leg assembly may be connected to the adjustment assembly. In the first position, the front leg assembly and the back leg assembly may be substantially parallel to the supporting surface, and, in the second position, the front leg assembly and the back leg assembly may be angled relative to the supporting surface. A vertical position of the seat base may be adjustable in equal or unequal increments.

In some aspects of the present disclosure, the adjustment assembly may have a receiver connected to at least a portion of the seat base and a locking member at the top end of the back leg assembly. The receiver may have a plurality of receiver teeth corresponding to a plurality of lockable positions, and the locking member may have one or more locking teeth configured for selectively engaging at least one of the plurality of receiver teeth. At least one of the plurality of receiver teeth may be angled toward the rear end of the seat base. The adjustment assembly may be spring loaded.

The locking member may be movable between an engaged position, where the one or more locking teeth is in contact with at least one of the plurality of receiver teeth, and a disengaged position, where the one or more locking teeth is disconnected from the plurality of receiver teeth. The locking member may be movable from the engaged position to the disengaged position by a handle. The handle may be connected to the locking member by a cable. The seat may further have a seat back connected to the seat base. An angle of the seat back relative to the seat base may be adjustable. The pivot point may have a pivot pin extending through an opening on each of the front leg assembly and the back leg assembly.

In some aspects of the present disclosure, an adjustable seat may include a seat base having a front end and a rear end, a front leg assembly having a top end engaged with the rear end of the seat base and a bottom end opposite the top end for engaging a supporting surface, and a back leg assembly having a top end engaged with the front end of the seat base and a bottom end opposite the top end for engaging the supporting surface. The back leg assembly may be pivotally connected to the front leg assembly between the top end and the bottom end of the front leg assembly and the back leg assembly. The seat may have an adjustment assembly for selectively locking the front leg assembly relative to the back leg assembly at one of a plurality of lockable positions between a first position and a second position. The adjustment assembly may have a receiver connected to at least a portion of the seat base and a locking member at the top end of the back leg assembly. The receiver may have a plurality of receiver teeth corresponding to a plurality of lockable positions, and the locking member may have one or more locking teeth configured for selectively engaging at least one of the plurality of receiver teeth. The seat base may be elevated higher relative to the supporting surface in the second position than in the first position.

A watercraft may have a hull having an interior with a supporting surface and an adjustable seat engaging the supporting surface. The adjustable seat may include a seat base having a front end and a rear end, a front leg assembly having a top end engaged with the rear end of the seat base and a bottom end opposite the top end for engaging a supporting surface, and a back leg assembly having a top end engaged with the front end of the seat base and a bottom end opposite the top end for engaging the supporting surface. The back leg assembly may be pivotally connected to the front leg assembly between the top end and the bottom end of the front leg assembly and the back leg assembly. The seat may have an adjustment assembly for selectively locking the front leg assembly relative to the back leg assembly at one of a plurality of lockable positions between a first position and a second position. The seat base may be elevated higher relative to the supporting surface in the second position than in the first position.

These and other features and characteristics of adjustable seats, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only.

DETAILED DESCRIPTION OF THE PREFERRED EMBODIMENTS

The illustrations generally show non-limiting aspects of the devices and methods of the present disclosure. While the descriptions present various aspects of the devices, it should not be interpreted in any way as limiting the disclosure. Furthermore, modifications, concepts, and applications of the disclosure's aspects are to be interpreted by those skilled in the art as being encompassed, but not limited to, the illustrations and descriptions herein. Various modifications, equivalents, variations, and alternatives, however, will remain readily apparent to those skilled in the art. Any and all such modifications, variations, equivalents, and alternatives are intended to fall within the spirit and scope of the present disclosure.

As used herein, the singular articles "a," "an," and "the" include plural referents unless otherwise expressly and unequivocally limited to one referent. Further, for purposes of the description herein, the terms "end", "upper", "lower", "right", "left", "vertical", "horizontal", "top", "bottom", "lateral", "longitudinal" and derivatives thereof shall relate to the disclosure as it is oriented in the drawing figures. However, it is to be understood that the disclosure may assume various alternative variations and steps, except where expressly specified to the contrary. Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10. Unless otherwise indicated, all numbers expressing dimensions, quantities of ingredients, flow rates, pressures, and so forth used in the specification and claims are to be understood as modified in all instances by the term "about."

Referring to the drawings in which like reference characters refer to like parts throughout the several views thereof, the present disclosure is directed to an adjustable seat for watercraft, and more particularly to an adjustable seat configured to provide both a lowered and an elevated seating position.

Figure 1:
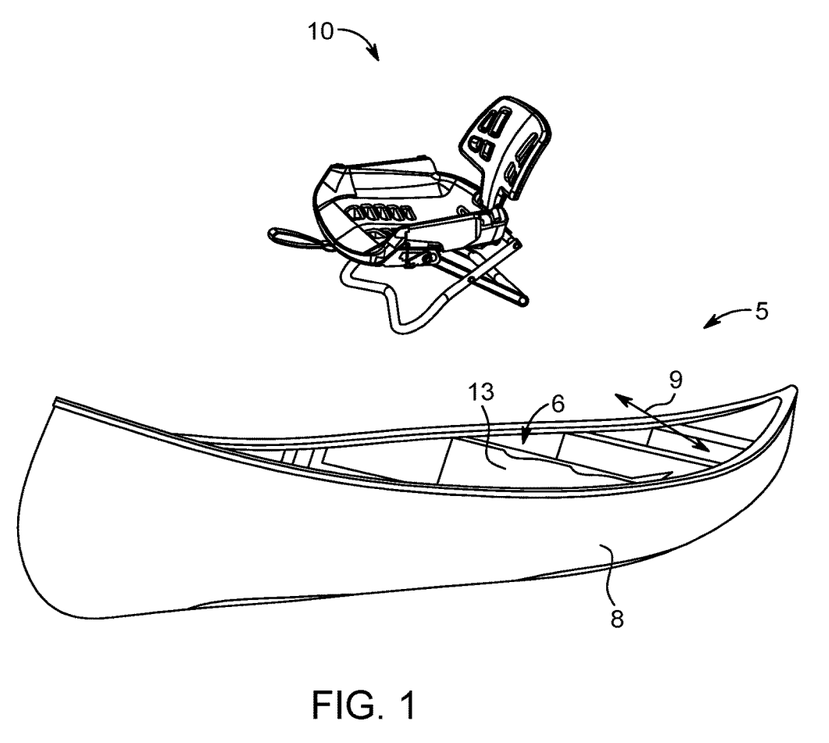
FIG. 1 is an exploded view of an adjustable seat configured for use with a watercraft in accordance with one embodiment.

With initial reference to FIG. 1, an adjustable seat 10 (hereinafter referred to as "seat 10") may be configured for use with a watercraft 5, such as a kayak, a canoe, or the like. Seat 10 may be positioned within an interior 6 of a hull 8 of watercraft 5. In some aspects, seat 10 may be supported in a supporting surface 13 within interior 6 of hull 8. Seat 10 may be removably or non-removably connected to watercraft 5. In some aspects, seat 10 is removably installed in watercraft 5. Seat 10 is desirably dimensioned such that it can be accommodated within a beam 9 of watercraft 5. Seat 10 may be releasably connected to watercraft 5, such as by fasteners, clips, snaps, magnets, or other connection means. In other aspects, seat 10 may be permanently installed in watercraft 5. For example, at least a portion of seat 10 may be permanently and non-removably connected to watercraft 5 by fasteners, welding, molding, or other connection means. In further aspects, a first portion of seat 10 may be permanently installed in watercraft 5, while a second portion of seat 10 may be removably connected to the first portion and/or watercraft 5.

Figure 2A:
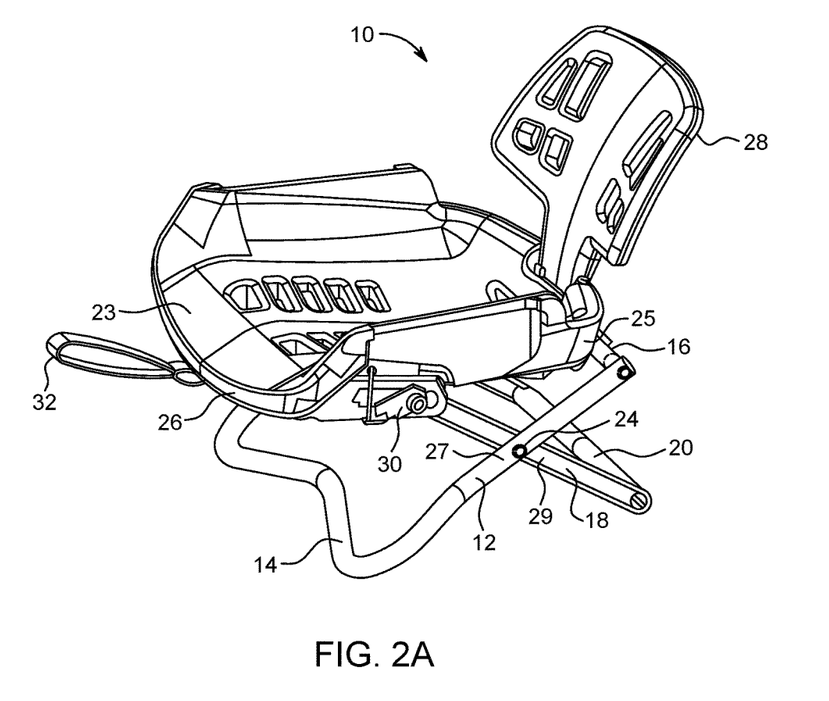
FIG. 2A is a perspective view of the adjustable seat shown in FIG. 1.
Figure 2B:
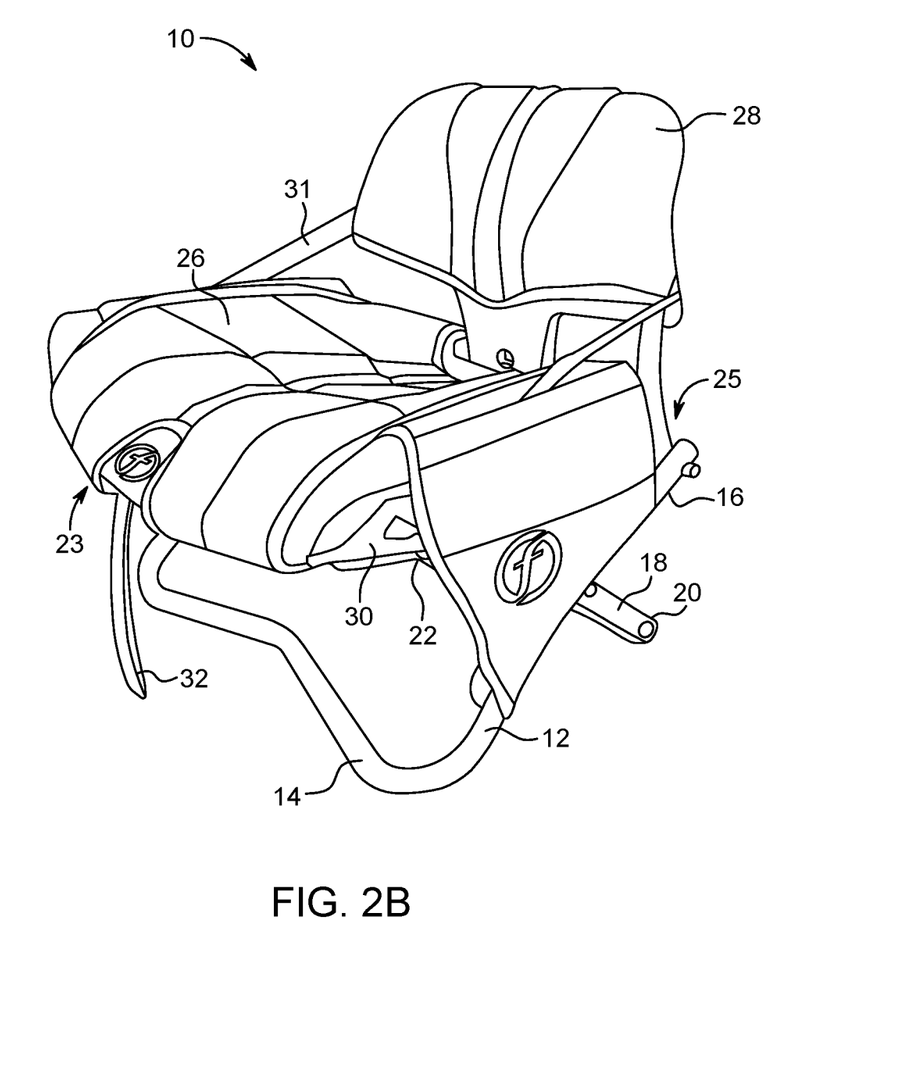
FIG. 2B is a perspective view of an adjustable seat in accordance with another embodiment.
Figure 3:
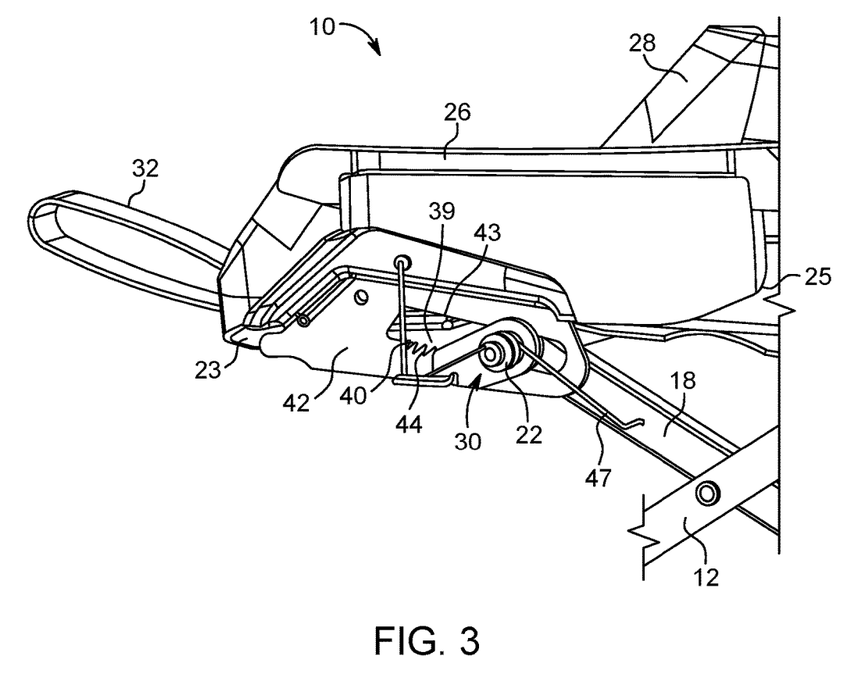
FIG. 3 is a side view of the adjustment assembly for use with an adjustable seat shown in an engaged position.
Figure 4:
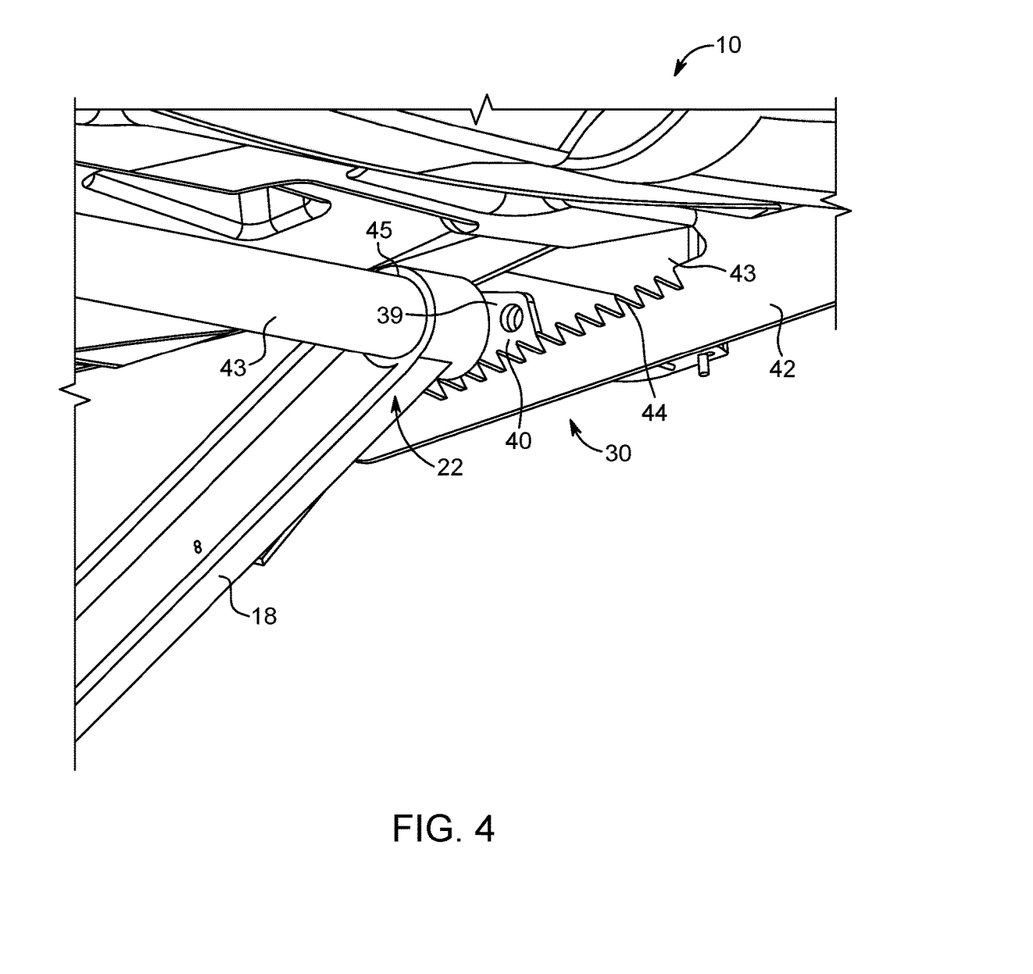
FIG. 4 is a bottom view of the adjustment assembly for use with an adjustable seat shown in the engaged position.
Figure 5:
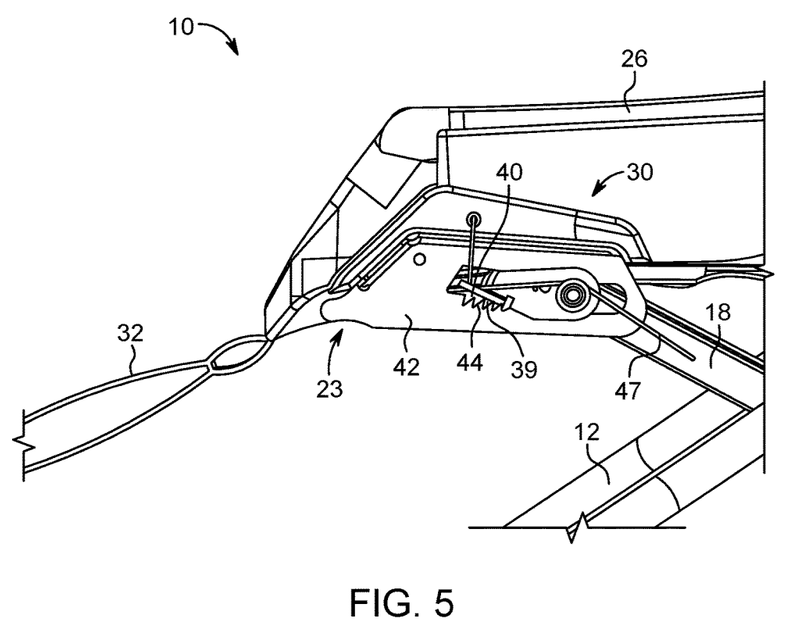
FIG. 5 is a side view of the adjustment assembly for use with an adjustable seat shown in a disengaged position.
Figure 6:
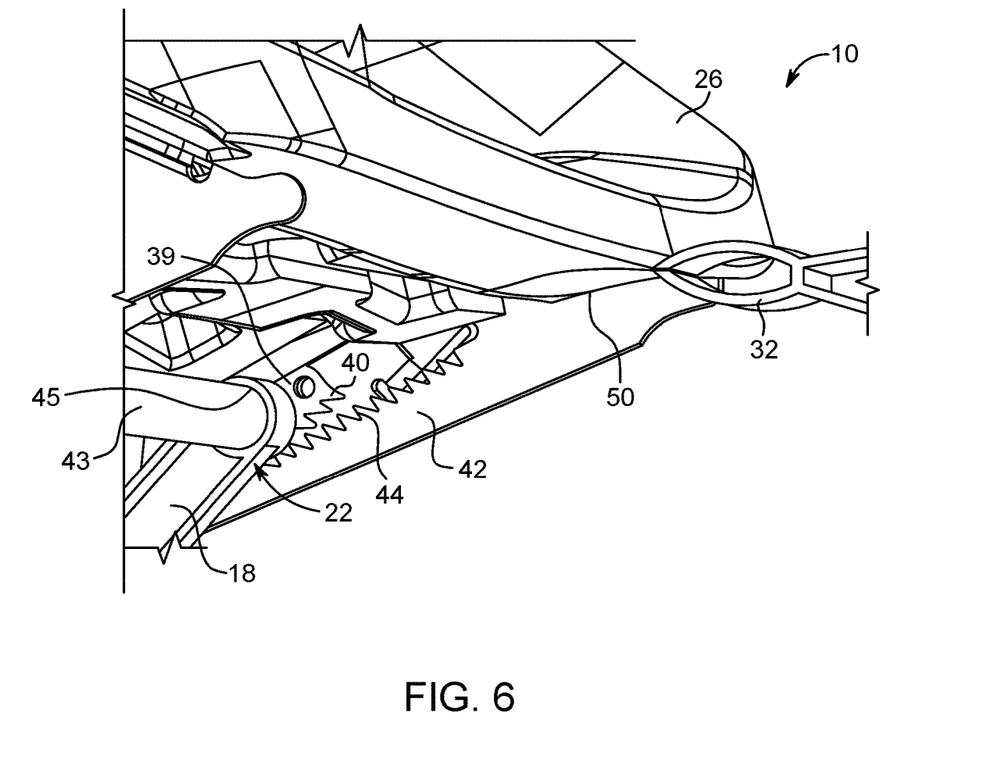
FIG. 6 is a bottom view of the adjustment assembly for use with an adjustable seat shown in the disengaged position.

With reference to FIGS. 2A-2B, seat 10 has a seat base 26 and a seat back 28. Seat base 26 and/or seat back 28 may be shaped to conform to a user's body to provide a more comfortable and secure position for the user. In various aspects, seat 10 may have a fixed or removable cushion (not shown) for use with seat base 26 and/or seat back 28. While FIGS. 2A-2B depict one exemplary and non-limiting configuration of seat base 26 and seat back 28, other configurations may be used. In some aspects, seat back 28 may be adjustable relative to seat base 26. For example, an angle of inclination of seat back 28 may be adjustable relative to seat base 26. Seat back 28 may be configured to fold onto seat base 26 when not in use. In other aspects, seat back 28 may be fixed relative to seat base 26. A handle 31 (shown in FIG. 2B) may be provided for adjusting a position of seat back 28 relative to seat base 26. Desirably, handle 31 is accessible to the user while in the seated position, such that adjustment of seat back 28 inclination can be easily accomplished by the user while seated, and even while the watercraft is moving.

In some aspects, seat 10 may be provided with adjustable elements (not shown), such as slide rails that allow the position of seat 10 to be adjusted in a fore-and-aft direction of watercraft 5. In various aspects, seat 10, including seat base 26 and seat back 28, may be formed from any suitable material including, for example, fabric, foam, metal, fiberglass, molded plastic, or a combination thereof, and may be configured with various adjustment capabilities. For example, seat base 26 and/or seat back 28 may be manufactured out of a plastic material with fabric/foam/neoprene covering, or stretched canvas/nylon. In some aspects, seat base 26 and/or seat back 28 may have one or more inflatable elements to provide support to the user's body in the seated position. Front leg assembly 12 and back leg assembly 18 may be manufactured with metal/alloy/or aluminum tubing with stainless steel parts/hardware.

With reference to FIG. 2A, seat 10 generally includes a front leg assembly 12 and a back leg assembly 18, which are connected at a pivot point 24. In some aspects, pivot point 24 may have a pivot pin 27 extending through an opening 29 provided on each of front leg assembly 12 and back leg assembly 18. Front leg assembly 12 and back leg assembly 18 are pivotally connected to one another at pivot point 24 at their approximate midpoint to create a scissor arrangement. There is a corresponding pivot point connecting front leg assembly 12 and back leg assembly 18 on the other side of seat 10 which is not shown in FIG. 1. It is to be understood that the features described herein are preferably symmetrical, although only one side is described. In some aspects; however, the features may be asymmetrical. Front leg assembly 12 has a bottom end 14 that contacts the supporting surface on which seat 10 is placed, such as beam 9 of watercraft 5 (shown in FIG. 1), the floor of any other structure, or the ground. In some aspects, bottom end 14 of front leg assembly 12 may be slidable on the supporting surface to allow movement of seat 10 from an elevated position to a lowered position. In other aspects, bottom end 14 of front leg assembly 12 may be fixed, such as by a mechanical connection, to a supporting surface. Bottom end 14 may have a fixed or removable contact member (not shown), such as a pad, for mounting front leg assembly 12 to the supporting surface. In some aspects, bottom end 14 may have one or more attachment members (not shown) for releasably securing bottom end 14 to a surface, such as beam 9 of watercraft 5 (shown in FIG. 1), the floor of any other structure, or the ground.

Front leg assembly 12 has a top end 16 that is connected to a rear end 25 of seat base 26. In some aspects, the connection between top end 16 of front leg assembly 12 and rear end 25 of seat base 26 is a pivoting connection about a fixed or movable pivot point to allow movement of seat 10 from an elevated position to a lowered position. In other aspects, such as when bottom end 14 of front leg assembly 12 is fixed to a supporting surface, top end 16 may have a slidable connection with lower portion of seat base 26 between a first position corresponding to a lowered position of seat 10 and a second position corresponding to an elevated position of seat 10.

With continued reference to FIGS. 2A-2B, back leg assembly 18 likewise has a bottom end 20 that contacts such supporting surface on which seat 10 is placed, such as beam 9 of watercraft 5 (shown in FIG. 1), the floor of any other structure, or the ground. In some aspects, bottom end 20 of back leg assembly 18 may be slidable on the supporting surface to allow movement of seat 10 from an elevated position to a lowered position. In other aspects, bottom end 20 of front leg assembly 12 may be fixed, such as by a mechanical connection, to the supporting surface. Bottom end 20 may have a fixed or removable contact member (not shown), such as a pad, for mounting back leg assembly 18 to the supporting surface. In some aspects, bottom end 20 may have one or more attachment members (not shown) for releasably securing bottom end 20 to a surface, such as beam 9 of watercraft 5 (shown in FIG. 1), the floor of any other structure, or the ground.

Back leg assembly 18 has a top end 22 that is connected to a front end 23 of seat base 26. In some aspects, the connection between top end 22 of back leg assembly 18 and front end 23 of seat base 26 is a pivoting connection about a fixed or movable pivot point to allow movement of seat 10 from an elevated position to a lowered position. In other aspects, such as when bottom end 20 of back leg assembly 18 is fixed to a supporting surface, top end 22 may have a slidable connection with lower portion of seat base 26 between a first position corresponding to a lowered position of seat 10 and a second position corresponding to an elevated position of seat 10. One or both top ends 16, 22 may be connected at a fixed pivot point on seat base 26 to allow for a sliding connection of one or both bottom ends 14, 20 to the supporting surface. In aspects where one or both top ends 16, 22 have a sliding connection with seat base 26, one or both bottom ends 14, 20 may be fixed to the supporting surface.

Referring to FIGS. 3-6, top end 22 of back leg assembly 18 is connected to adjustment assembly 30. The adjustment assembly allows the user to adjust seat base 26 to multiple seat heights, including a first or "lowered, "flush", or "nested" position. The first position of seat 10 may be particularly desirable when a user is paddling watercraft 5. The first position of seat 10 lowers the center of gravity of the watercraft, thereby increasing its stability, particularly in rough waters. Using adjustment assembly 30 described herein, the height of seat base 26 relative to the supporting surface can be adjusted to a second, or "raised" or "elevated" position. The second position of seat 10 may be preferred when the watercraft is stationary for activities, such as fishing. In some aspects, seat base 26 may be elevated up to 12 inches between a first position and a second position. Adjustment assembly 30 may be configured with various increments of adjustment. In some aspects, adjustment assembly 30 may be configured with 1 inch increments of height adjustment between 0 and 12 inches. However, the total height variation between the first and second position of seat base 26 and adjustment increments between the first and second position can be modified to any desired size.

Adjustment assembly 30 is configured to selectively lock the position of front leg assembly 12 and back leg assembly 18, thereby adjusting the height of seat base 26 relative to the supporting surface. Due to a scissor-like configuration of front leg assembly 12 and back leg assembly 18, adjustment assembly 30 can selectively lock front leg assembly 12 and back leg assembly 18 at various angles relative to each other to adjust the height of seat base 26. For example, adjustment assembly 30 may be used to lock front leg assembly 12 and back leg assembly 18 between a first, or lowered position, where front leg assembly 12 and back leg assembly 18 are substantially parallel to the supporting surface, and a second, or elevated position, where front leg assembly 12 and back leg assembly 18 are angled relative to the supporting surface. Adjustment assembly 30 may be used to lock front leg assembly 12 and back leg assembly 18 in one or more positions between the first (lowered) and second (elevated) positions.

In some aspects, adjustment assembly 30 has an adjustment assembly receiver 42 that is connected to or formed on the underside of front end 30 of both sides of seat base 26. In other aspects, a single adjustment assembly receiver 42 may be provided on one side of seat base 26. Adjustment assembly receiver 42 may be removably or non-removably connected to seat base 26. In some aspects, adjustment assembly receiver 42 is monolithically formed with at least a portion of seat base 26. Adjustment assembly receiver 42 has an opening 45 with a plurality of seat height adjustment members defined on a lower end of the opening 45. The plurality of adjustment members, such as a plurality of receiver teeth 44, extend in a fore-and-aft direction of seat base 26 and are configured for engaging a corresponding locking member to fix a height of seat base 26 at a desired height, as described herein. Each tooth of the plurality of receiver teeth 44 may correspond to a specific height setting of seat 10, as described herein. In some aspects, the plurality of receiver teeth 44 may be angled toward rear end 25 of seat base 26.

With continued reference to FIGS. 3-6, top end 22 of back leg assembly 18 has a locking member 39 that is configured for selectively engaging receiver teeth on adjustment assembly receiver 42. In some aspects, a pair of locking members 39 may be provided on lateral sides of seat base 26 to correspond to a pair of adjustment assembly receivers 42. Locking member 39 is movable between an engaged position, where one or more of locking teeth 40 are in contact with one or more receiver teeth 44, and a disengaged position, where the one or more locking teeth 40 are disconnected from one or more receiver teeth 44. In the engaged position, locking member 39 locks the position of front leg assembly 12 and back leg assembly 18 to maintain the height of seat 10 at a desired setting and prevent front leg assembly 12 and back leg assembly 18 from moving relative to one another about pivot point 24. In the disengaged position, locking member 39 unlocks front leg assembly 12 and back leg assembly 18 from one other such that height of seat base 26 may be adjusted by pivoting front leg assembly 12 and back leg assembly 18 relative to one another about pivot point 24. In some aspects, locking member 39 may have a rod 43 (shown in FIG. 4 and FIG. 6) extending through an opening 45 on top end 22 of back leg assembly 18. Rod 43 may connect opposing locking members 39 provided on lateral sides of seat base 26. With rotation of rod 43 about its longitudinal axis, locking member 39 may be moved between the engaged position and the disengaged position.

The locking member 39 may be movable between the engaged position and the disengaged position using a handle 32. In some aspects, handle 32 may be provided on front end 23 or on a lateral side of seat base 26. Handle 32 may be connected to locking member 39 by a cable 47 (shown in FIG. 3 and FIG. 5). In aspects where a pair of locking members 39 is provided, cable 47 may be connected to one or both locking members 39. In such aspects, cable 47 may extend through or along a bottom portion of seat base 26 such that two sides of cable 47 are attached together at handle 32. In some aspects, pulling handle 32 away from seat base 26 may disengage locking member 39 from the engaged position to allow the height of seat base 26 to be adjusted.

In operation, assembly teeth 40 mate and engage with receiver teeth 44 in a ratchet-type mechanism. One or both of adjustment assembly receiver 42 and receiver teeth 44 are positioned in such a manner that the height of seat base 26 can be adjusted relative to the supporting surface depending on the point in receiver teeth 44 where assembly teeth 40 are engaged. One skilled in the art will understand that similar interlocking mechanisms may be used instead of the assembly teeth 40 and receiver teeth 44 without departing from the scope of the invention. In other aspects, the handle 32 may be replaced by a knob, wheel, button, or the like to disengage locking teeth 40 of locking member 39 from engagement with one or more receiver teeth 44 on adjustment assembly receiver 42. Cable 47 may be replaced by a rigid link, a threaded rod, or a similar mechanical linkage. In some aspects, adjustment assembly 30 may be hydraulically, pneumatically, or electrically operated. For example, adjustment assembly 30 may have one or more motors powered by a power source, such as a battery, to selectively move seat base 26 between the lowered position and the elevated position. In some aspects, the arrangement of the adjustment assembly 30 may be reversed, such that adjustment assembly receiver 42 is provided on rear end 25 of seat base 26, while locking member 39 is provided on top end 16 of front leg assembly 12.

Figure 7A:
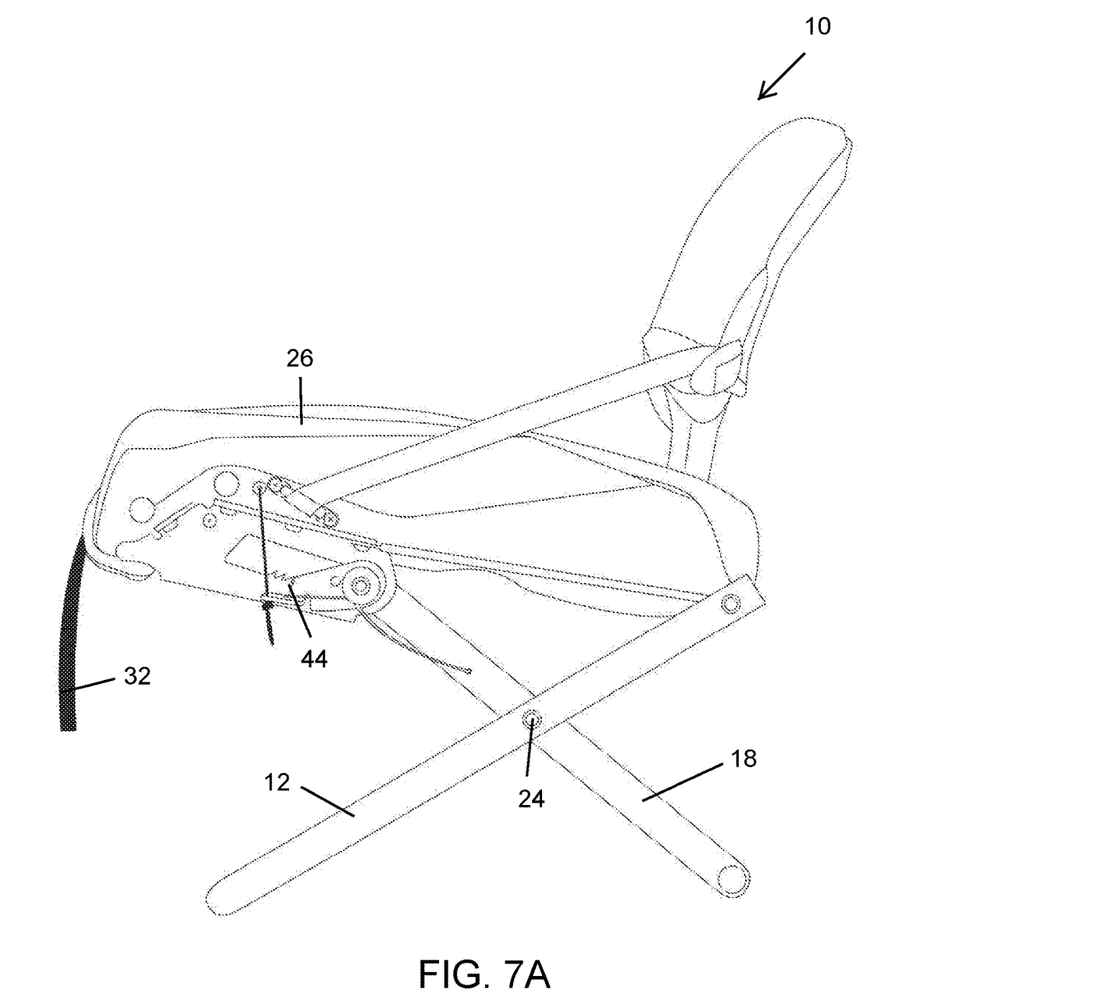
FIGS. 7A-7C are side views of an adjustable seat being lowered from an elevated position to a lowered position.
Figure 7B:
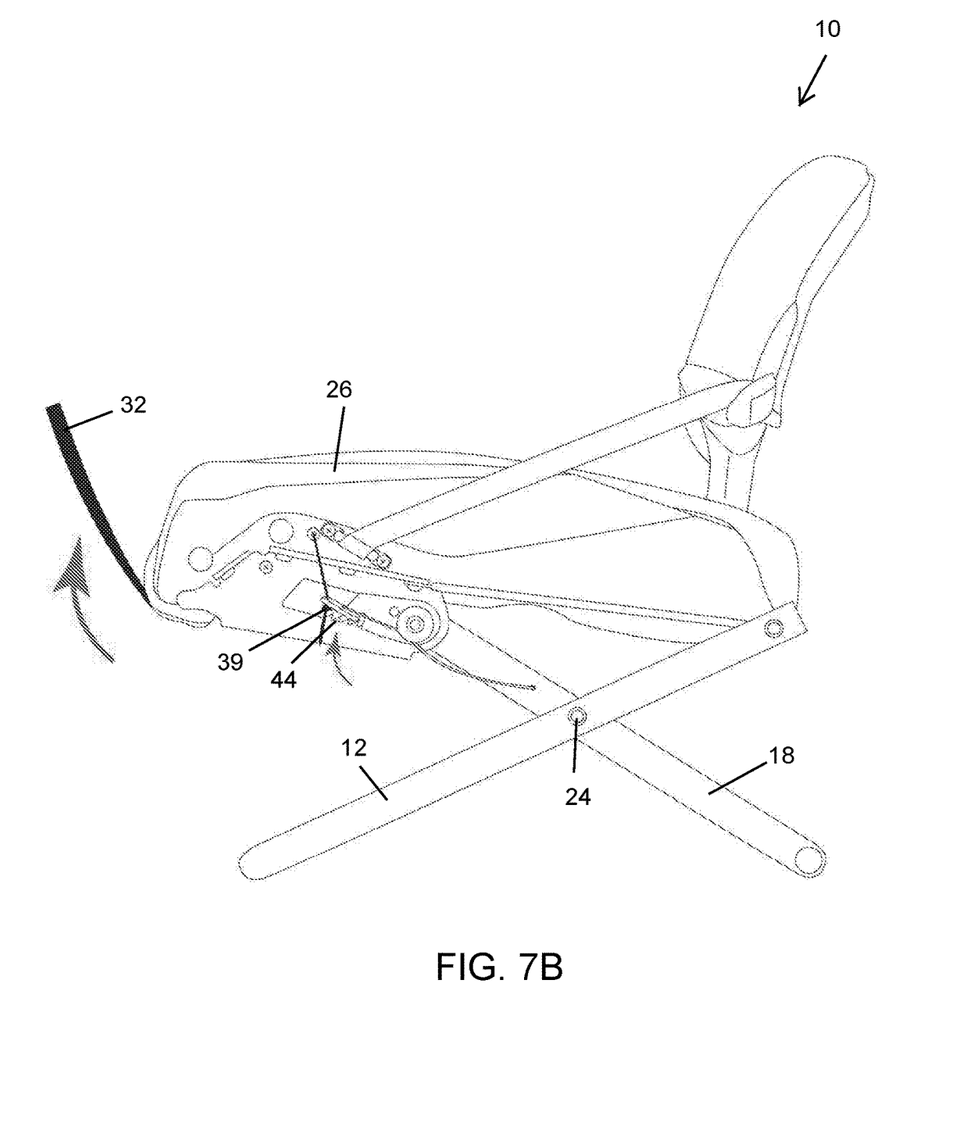
Figure 7C:
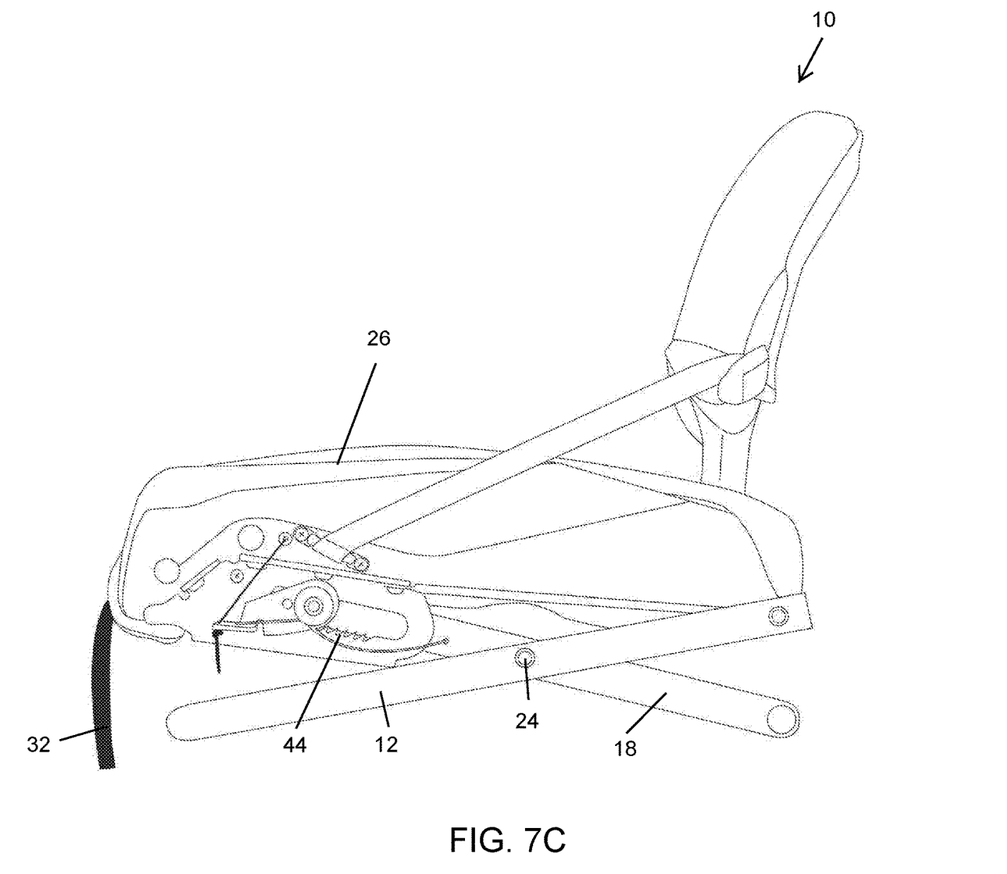

As described herein, height adjustment is based on the scissor action of front leg assembly 12 and back leg assembly 18. Each possible height of seat base 26 is obtained by assembly teeth 40 engaging and operating like a ratchet with receiver teeth 44 in order to obtain several heights. Adjustment assembly 30 may be spring loaded to aid the ease of operation. For example, a spring (not shown) may be used to aid in raising seat 10 from a lowered position to an elevated position, or in lowering seat 10 from an elevated position to a lowered position. Seat height may be raised by pulling handle 32 to disengage locking member 39 and lifting seat base 26 to a desired height. Seat base 26 may be raised through a pivoting action of front leg assembly 12 and back leg assembly 18 in a scissor-like manner about pivot point 24. Once a desired height of seat base 26 is obtained, handle 32 may be released to allow locking member 39 to lock adjustment assembly 30 in place. In other aspects, seat 10 may be raised by lifting seat base 26 in an upward direction while adjustment assembly 30 automatically moves locking member 39 from a first engagement position with receiver teeth 44 to a second engagement position with receiver teeth 44. To lower the seat 10 from an elevated position (FIG. 7A), handle 32 may be pulled, thereby disengaging locking member 39 from engagement with receiver teeth 44 (FIG. 7B). Seat base 26 may then be lowered through a pivoting action of front leg assembly 12 and back leg assembly 18 in a scissor-like manner about pivot point 24 (FIG. 7C). In this manner, seat 10 may be lowered and raised with only a one hand operation. In some aspects, the user may remain seated during height adjustment of seat 10. In other aspects, the user may sit up from seat 10 in order to raise or lower seat 10.

Although the disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements. For example, it is to be understood that the present disclosure contemplates that, to the extent possible, one or more features of any embodiment can be combined with one or more features of any other embodiment.

What is claimed is:

1. An adjustable seat comprising:
   a seat base;
   a leg assembly connected to the seat base, the leg assembly movable between a first position and a second position to adjust a height of the seat base relative to a support surface; and
   an adjustment assembly comprising a receiver on one of the seat base and the leg assembly and a locking member on the other of the seat base and the leg assembly for locking the leg assembly at one of a plurality of lockable positions between the first position and the second position.

2. The adjustable seat of claim 1, wherein the leg assembly comprises a front leg assembly having a top end connected to a rear end of the seat base and a back leg assembly having a top end connected to a front end of the seat base.

3. The adjustable seat of claim 2, wherein the front leg assembly is pivotally connected to the back leg assembly.

4. The adjustable seat of claim 2, wherein one of a bottom end of the front leg assembly and a bottom end of the back leg assembly is fixed relative to the support surface and the other of the bottom end of the front leg assembly and the bottom end of the back leg assembly is slidable relative to the support surface during movement of the leg assembly between the first position and the second position.

5. The adjustable seat of claim 2, wherein, in the first position, the front leg assembly and the back leg assembly are substantially parallel to the supporting surface, and wherein, in the second position, the front leg assembly and the back leg assembly are angled at an acute angle relative to the supporting surface.

6. The adjustable seat of claim 1, wherein the seat base is elevated higher relative to the supporting surface in the second position than in the first position.

7. The adjustable seat of claim 1, wherein the receiver has a plurality of receiver teeth corresponding to the plurality of lockable positions, and wherein the locking member has one or more locking teeth configured for selectively engaging at least one of the plurality of receiver teeth.

8. The adjustable seat of claim 7, wherein the locking member is movable between an engaged position, where the one or more locking teeth are in contact with at least one of the plurality of receiver teeth, and a disengaged position, where the one or more locking teeth are disconnected from the plurality of receiver teeth.

9. The adjustable seat of claim 7, wherein the plurality of receiver teeth are spaced apart from each other in equal or unequal increments.

10. The adjustable seat of claim 7, wherein the plurality of receiver teeth are angled toward the rear end of the seat base.

11. The adjustable seat of claim 1, wherein the locking member is movable from the engaged position to the disengaged position by a handle.

12. The adjustable seat of claim 9, wherein the handle is connected to the locking member by a cable.

13. The adjustable seat of claim 1, wherein the adjustment assembly is spring loaded.

14. A watercraft comprising:
    a hull having an interior with a supporting surface; and
    an adjustable seat engaging the supporting surface, the adjustable seat comprising:
        a seat base;
        a leg assembly connected to the seat base, the leg assembly movable between a first position and a second position to adjust a height of the seat base relative to the support surface; and
        an adjustment assembly comprising a receiver on one of the seat base and the leg assembly and a locking member on the other of the seat base and the leg assembly for locking the leg assembly at one of a plurality of lockable positions between the first position and the second position.

15. The watercraft of claim 14, wherein the leg assembly comprises a front leg assembly having a top end connected to a rear end of the seat base and a back leg assembly having a top end connected to a front end of the seat base.

16. The watercraft of claim 15, wherein the front leg assembly is pivotally connected to the back leg assembly.

17. The watercraft of claim 15, wherein one of a bottom end of the front leg assembly and a bottom end of the back leg assembly is fixed relative to the support surface and the other of the bottom end of the front leg assembly and the bottom end of the back leg assembly is slidable relative to the support surface during movement of the leg assembly between the first position and the second position.

18. The watercraft of claim 14, wherein the receiver has a plurality of receiver teeth corresponding to the plurality of lockable positions, and wherein the locking member has one or more locking teeth configured for selectively engaging at least one of the plurality of receiver teeth.

19. The watercraft of claim 18, wherein the locking member is movable between an engaged position, where the one or more locking teeth are in contact with at least one of the plurality of receiver teeth, and a disengaged position, where the one or more locking teeth are disconnected from the plurality of receiver teeth.

20. An adjustable seat comprising:
    a seat base having a front end and a rear end;
    a front leg assembly having a top end engaged with the rear end of the seat base and a bottom end opposite the top end for engaging a supporting surface;
    a back leg assembly having a top end engaged with the front end of the seat base and a bottom end opposite the top end for engaging the supporting surface, the back leg assembly pivotally connected to the front leg assembly between the top end and the bottom end of the front leg assembly and the back leg assembly; and
    an adjustment assembly for selectively locking the front leg assembly relative to the back leg assembly at one of a plurality of lockable positions between a first position and a second position, the adjustment assembly comprising a receiver on one of the seat base and the top end of the back leg assembly and a locking member on the other of the seat base and the top end of the back leg assembly,
wherein the receiver has a plurality of receiver teeth corresponding to a plurality of lockable positions, and wherein the locking member has one or more locking teeth configured for selectively engaging at least one of the plurality of receiver teeth.

\* \* \* \* \*